United States Patent [19]

Lupke et al.

[11] 4,292,014
[45] Sep. 29, 1981

[54] FEED MECHANISM COMPRISING AN ENDLESS MEMBER CONFIGURED AS A DOUBLE HELIX

[76] Inventors: Manfred A. A. Lupke, 35 Ironshield Crescent; Gerd P. H. Lupke, 46 Stornoway Crescent, both of Thornhill, Ontario, Canada

[21] Appl. No.: 186,628

[22] Filed: Sep. 12, 1980

[51] Int. Cl.³ .......................... B29F 3/00; F16J 15/16
[52] U.S. Cl. .............................. 425/72 R; 198/659;
198/778; 277/203; 425/326.1; 425/336;
425/376 B; 425/377; 425/438; 425/440;
425/457; 425/470; 222/414
[58] Field of Search .......................... 264/173, 209;
425/376 A, 376 B, 376 R, 377, 380, 436 R, 440,
438, 460, 468, 469, 403, 326.1, 115, 113, 393,
363, 457, 471, 441, 370, 387.1, 72 R, 336, 470;
156/244.11, 244.13, 446, 457; 277/93 R, 95,
203; 198/659, 724, 758; 222/414

[56] References Cited

U.S. PATENT DOCUMENTS

| | | | |
|---|---|---|---|
| 3,155,559 | 11/1964 | Hall | 156/429 |
| 3,464,879 | 9/1969 | Poulsen | 425/363 |
| 3,655,489 | 4/1972 | Poulsen | 156/429 |
| 3,784,667 | 1/1974 | Drostholm et al. | 264/145 |
| 3,809,514 | 5/1974 | Nunez | 425/460 |
| 3,861,984 | 1/1975 | Poulsen | 156/429 |
| 3,943,224 | 3/1976 | Drostholm et al. | 264/209 |
| 3,974,019 | 8/1976 | Tanaka | 156/429 |
| 4,036,352 | 7/1977 | White | 198/778 |
| 4,174,365 | 11/1979 | Pahl | 264/209.6 |
| 4,174,984 | 11/1979 | Meadows | 156/429 |

Primary Examiner—W. E. Hoag
Attorney, Agent, or Firm—Ridout & Maybee

[57] ABSTRACT

A feed mechanism comprising a rotor and an endless flexible belt carried by the rotor. The rotor comprises a pair of cylindrical guide members arranged coaxially one within the other, the guide members being mounted for rotation in unison about a common axis. Each of the guide members provides a helical groove defining a respective feed channel, the grooves being of the same pitch and opposite hand, and the belt is constrained by the guide members to extend helically along the feed channels in sliding engagement with the guide members. The belt protrudes from one of the feed channels to engage a restraining surface which restrains the belt against rotation so that, in response to rotation of the rotor, the belt is continuously advanced along one of the feed channels and returned along the other, thereby providing a continuously advancing non-rotary bearing surface which bears against the restraining surface.

26 Claims, 14 Drawing Figures

FEED MECHANISM COMPRISING AN ENDLESS MEMBER CONFIGURED AS A DOUBLE HELIX

This invention relates to feed mechanisms wherein a bearing member such as an endless flexible belt or chain carried by a rotor is constrained to provide a continuously advancing bearing or support surface in response to rotation of the rotor.

In one of its aspects the invention provides a feed mechanism comprising a rotor and an endless flexible bearing member carried by the rotor. The bearing member may be an endless belt, or in some applications may be a chain of articulately interconnected bearing elements. The rotor comprises a pair of cylindrical guide members arranged coaxially one within the other, the guide members being mounted for rotation in unison about a common axis. Each of the guide members provides a helical groove defining a respective feed channel, the grooves being of the same pitch and opposite hand, and the bearing member is constrained by the guide members to extend helically along the feed channels in sliding engagement with the guide members. The bearing member protrudes from one of the feed channels to engage a restraining surface which restrains the bearing member against rotation so that, in response to rotation of the rotor, the bearing member is continuously advanced along one of the feed channels and returned along the other, thereby providing a continuously advancing non-rotary bearing surface which bears against the restraining surface.

In one application of the invention, as applied to the manufacture of plastic tubing, the rotor extends axially from an extrusion head from which the tubing is continuously extruded, the bearing member providing a continuously advancing, non-rotary support surface for the tubing as the tubing is extruded, the tubing frictionally engaging the bearing member to restrain it against rotation. In this application the bearing member may provide a contoured surface against which the tubing is molded by gas pressure as it is extruded.

In this application of the invention it may be advantageous, depending upon the condition of the tube as it is extruded, to provide auxiliary means for restraining the bearing member against rotation.

In another application of the invention, as applied to a shaft seal, the rotor is mounted on an extension of the shaft and driven thereby, the bearing member being an endless flexible belt which frictionally engages a cylindrical wall member extending from the shaft housing to restrain the shaft against rotation, the belt thereby providing a continuously advancing, non-rotary bearing surface providing a seal between the shaft extension and the wall. In this case it is important that successive adjacent convolutions of the belt should be in edge-abutting relation so that said bearing surface will be continuous.

The invention also provides, according to another one of its aspects, a rotary mandrel. In this case the mandrel comprises: a rotary shaft; first and second cylindrical guide members mounted coaxially on said shaft for rotation therewith, the guide members having respective external helical grooves thereon defining first and second feed channels; said helical grooves being of the same pitch and opposite hand; an endless flexible bearing member carried by said guide members and constrained thereby, the belt having a first portion extending helically along said first feed channel and a second portion extending helically along said second feed channel, the bearing member slidingly engaging the guide members along said channels; the second portion of the bearing member protruding from said second channel and successive adjacent convolutions thereof being disposed in edge-abutting relationship to define a continuous mandrel support surface, and differential drive means for effecting rotation of said support surface in response to rotation of the shaft at a speed different therefrom. The differential drive means comprises a plurality of rollers frictionally engaging said first portion of the bearing member, the rollers extending parallel to the shaft, and epicyclic drive means coupled to the rollers and said shaft for rotating the rollers in response to rotation of the shaft in the direction opposite thereto.

The principles of the invention will be readily apparent from the following description and the accompanying drawings, which illustrate by way of example several applications of the invention.

Figure 1:
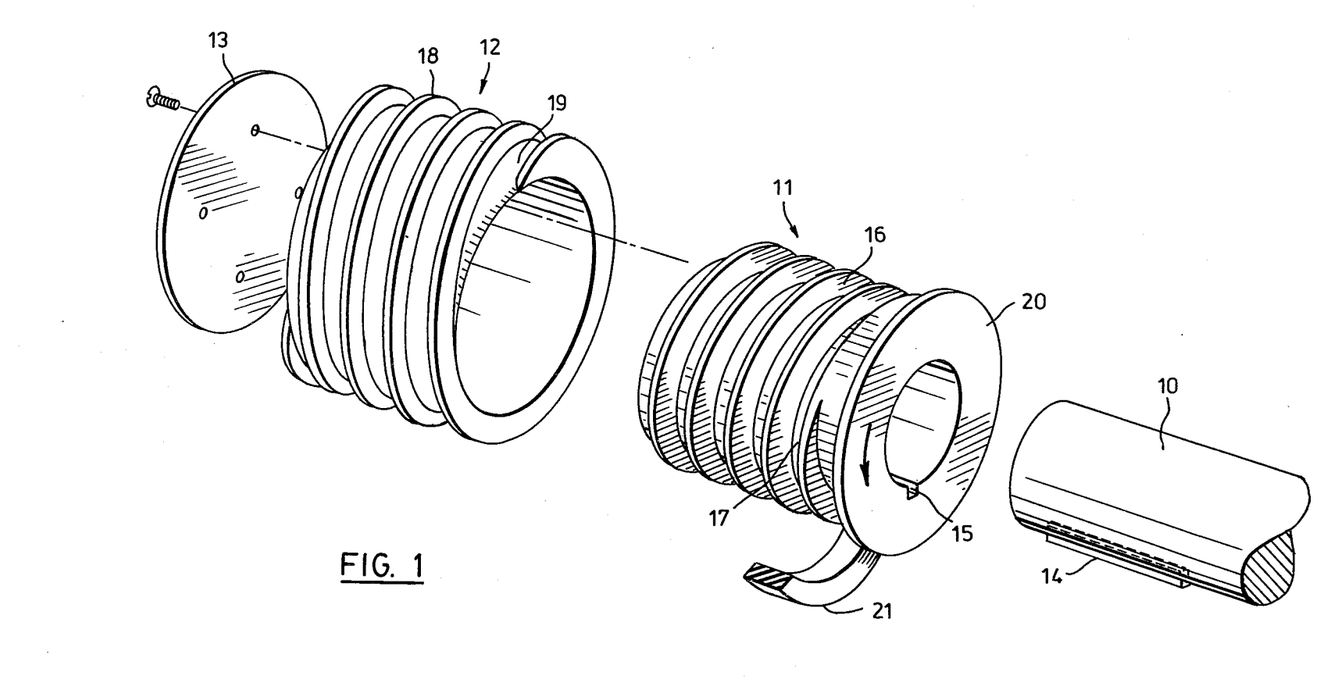
FIG. 1 is an exploded view showing the components of a feed mechanism to be used as a mold in the production of thermoplastic tubing.
Figures 2, 3:
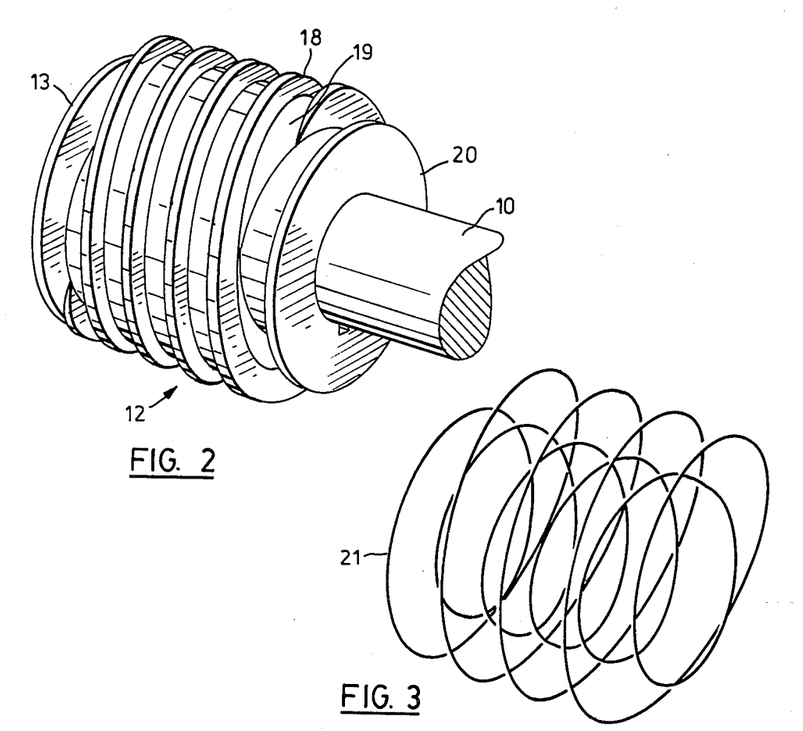
FIG. 2 shows the components of FIG. 1 in assembled relation.
FIG. 3 is a line diagram showing the double-helical configuration of the belt in the assembled device, the belt being omitted from FIG. 2 for clarity of illustration.
Figure 4:
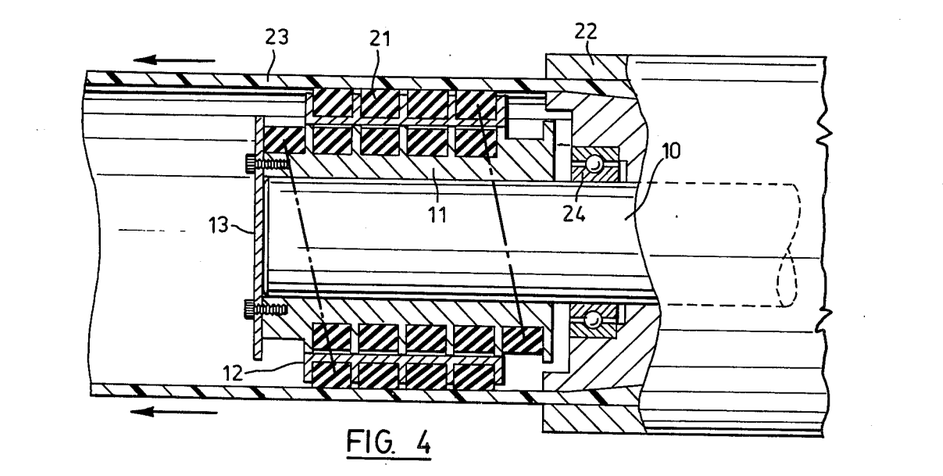
FIG. 4 is a sectional view showing the mold assembly in use in the production of thermoplastic tubing.

The principle of the feed mechanism will be apparent from FIGS. 1, 2 and 3. The mechanism comprises a rotary drive shaft 10, a sleeve 11 constituting a first cylindrical guide member, a second cylindrical guide member 12, and an end flange 13 for the member 12. The drive shaft 10 has a key 14 which keys into a slot 15 in the member 12. The components are assembled in coaxial relationship as shown in FIG. 2, the guide member 11 between disposed coaxially within the guide member 12, which is connected to the inner member 11 for rotation with it. The external surface of the inner guide member 11 is formed with an upstanding helical flange 16 which defines a helical groove or feed channel 17 extending along said external surface. The external surface of the outer guide member 12 is similarly formed with an upstanding helical flange 18 which defines a second helical groove or feed channel 19 extending along its outer surface; these helical grooves are of the same pitch, but it is important to note that they are of opposite hand, that is, one follows a left-handed helix and the other follows a right-handed helix. To secure the two guide members together the inner surface of the outer member 12 is welded adjacent its end to the last convolution of the flange 16, as best seen in FIG. 4. An annular end flange 20 on the inner guide member defines with said last convolution of the helical flange and extension of the feed channel 17. The end flange 13 similarly defines an extension of the feed channel at its other end.

An endless flexible belt 21, part of which is shown in FIG. 1, is carried by the inner and outer guide members, the belt 21 being constrained by the guide members to extend helically along the feed channels in the configuration of a double helix as shown in FIG. 3. Thus, the belt 21 has a first helically extending portion located by the feed channel 17 and a second helically extending portion located by the feed channel 19. The contacting surfaces of the belt and the cylindrical guide members are treated or lined with an antifriction material, such as TFE so that the belt can readily slide along the feed channels. Accordingly, since the second portion of the belt protrudes from the outer feed channel 19, by providing a non-rotating surface to engage the protruding portion of the belt frictionally the belt can be restrained against rotation so as to provide a non-rotating support surface which advances continuously in response to rotation of the drive shaft 10. In the case of a mechanism to be used in the manufacture of thermoplastic tubing by extrusion, the restraining surface will be provided by the tubing itself as it is formed, as illustrated in FIG. 4.

Referring now to FIG. 4, the apparatus for producing thermoplastic tubing comprises an extruder having an extrusion head 22, the extrusion head providing an annular die opening from which the thermoplastic material 23 is extruded as a cylindrical tube. The drive shaft 10 is journalled in bearings 24 for rotation about a horizontal axis, the shaft extending coaxially with the annular die opening. The guide members 11 and 12, and the belt 21 are assembled as described above with reference to FIGS. 1, 2 and 3.

As seen in FIG. 4, the exposed surface of the belt 21 protrudes from the helical feed channel of the outer guide member 12, forming a support surface for the tubing 23 as the latter is extruded. The tubing 23 frictionally engages said support surface of the belt thereby restraining the latter from rotating with the guide members. The shaft is rotated in the direction of the arrow in FIG. 1, so that the belt 21 is caused to follow a double helical path as shown in FIG. 3. The rotation of the shaft is such that the support surface formed by the outer helical portion of the belt advances continuously in the direction of the extruded tubing, i.e. to the left as shown in FIG. 4, and at the same speed.

Figure 5:
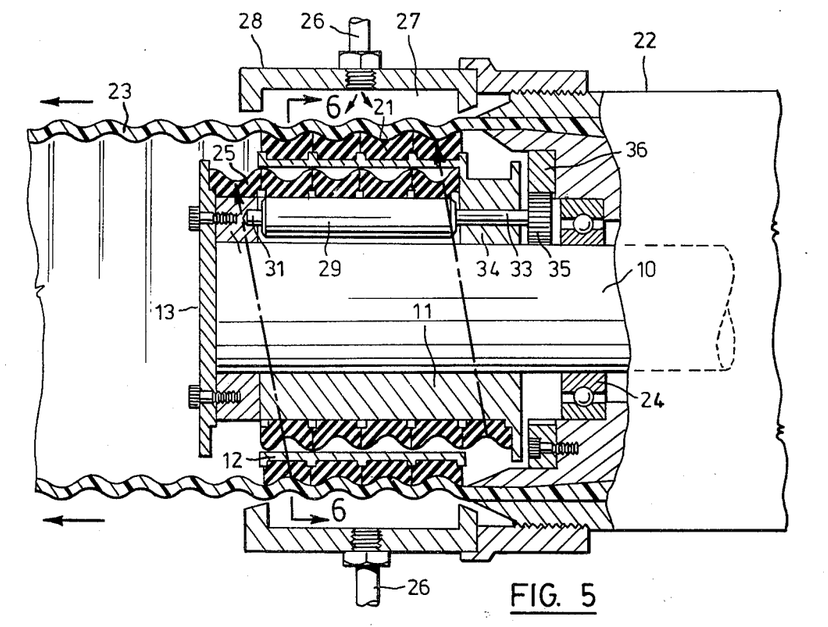
FIG. 5 is a view similar to FIG. 4 showing a modified assembly in use in the production of corrugated thermoplastic tubing.

The apparatus shown in FIG. 5 is basically the same as that of FIG. 4 and corresponding parts are denoted by the same reference numerals. However, this apparatus is designed for use in the production of corrugated thermoplastic tubing, and accordingly the outer surface of the belt is formed with a trough 25 extending uniformly for the entire length of the belt. Adjacent convolutions of the belt, as least in the outer helical portion of its path, are disposed in edge-abutting relation as shown in the figure so that the profiled surfaces of these convolutions merge together forming a continuous mold surface of corrugated configuration. The thermoplastic material, while it is still soft, is molded against this mold surface by air pressure. The air under pressure is introduced through pipes 26 into an annular chamber 27 surrounding the tubing, the chamber being formed by a cylindrical wall member 28 which extends axially from the extrusion head.

Figure 6:
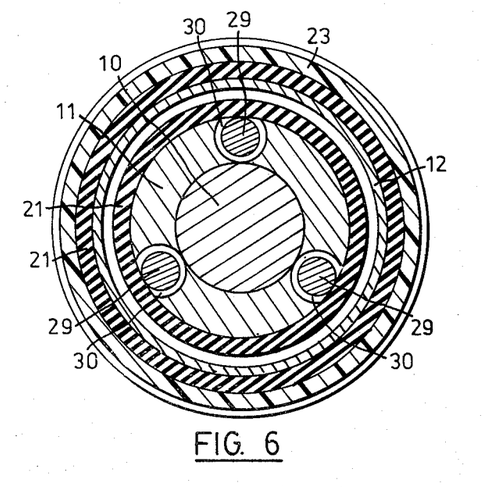
FIG. 6 is a section on line 6—6 in FIG. 5.

An important feature of this embodiment of the invention, however, as shown in FIGS. 5 and 6, is the provision of auxiliary restraining means for restraining the belt 21 against rotation. This may be required in cases where the plastic material engaging the belt surface has not set sufficiently to resist the shearing stresses to which it is subjected. The shearing stresses are normally quite small, of course, since the belt 21 readily slides over the surfaces of the guide channels, but any residual friction will tend to cause the belt to rotate with the shaft 10. The auxiliary restraining means in this construction comprises a plurality of rollers 29, equally spaced around the axis of the shaft 10 and extending parallel to it. The rollers 29 are journalled in axially extending recesses 30 provided adjacent to the periphery of the sleeve 11, the rollers protruding from the recesses by an amount sufficient to bear on the inner portion of the belt and engage it frictionally. Each roller 29 has a stub shaft 31 at one end, which is journalled in an annular carrier 32 bolted to the end flange 13. The other end of each roller 29 has a shaft 33 which is journalled in a bearing member 34 and carries a pinion 35 which meshes with a stationary ring gear 36 mounted on the front face of the extrusion head 22. It will be readily seen from the drawings that the shaft 10, end flange 13, rollers 29, pinions 35 and ring gear 36 form an epicyclic drive by which the rollers are caused to rotate in response to rotation of the shaft 10, but in the opposite direction. Thus the rollers exert a force on the belt 21 tending to rotate the belt in the opposite direction from the shaft and so countering the tendency for the shaft to rotate the belt with it. It should be noted that this counter force need not exactly cancel out the rotating force exerted by the rotary shaft; it is only necessary that the resultant force should be small enough, having regard to the condition of the tube 23, to enable the latter to constrain the belt against rotation without itself being subjected to shear.

Figure 7:
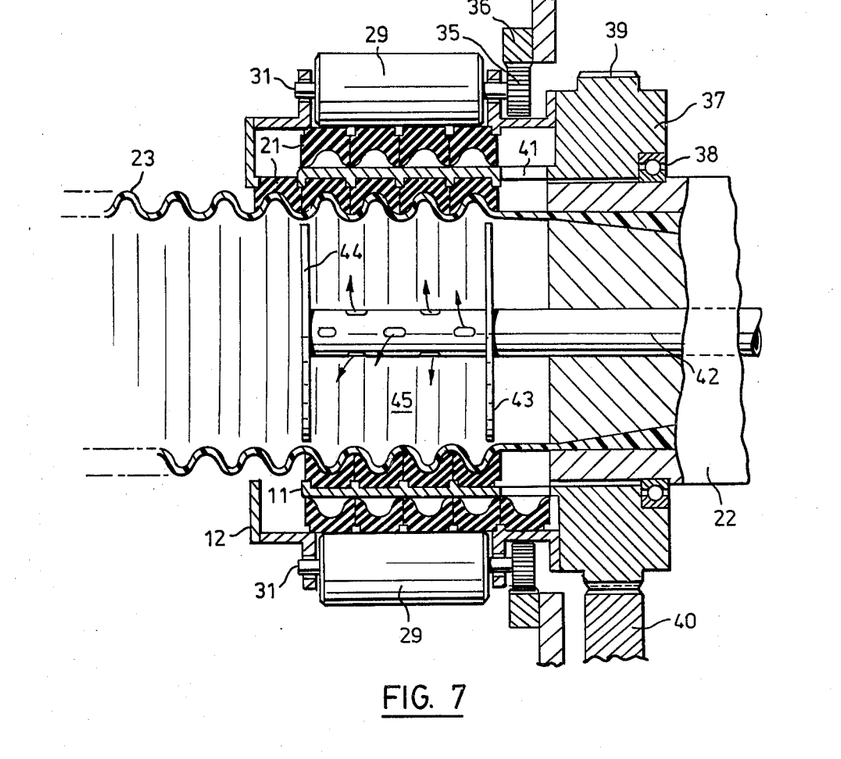
FIG. 7 shows yet another feed mechanism used as a mold assembly in the production of corrugated thermoplastic tubing.

The apparatus shown in FIG. 7 is generally similar to that of FIG. 5 and the same reference numerals are used to denote corresponding parts. In this case, however, air under pressure is introduced to the interior of the tubing to expand the tubing outwardly against the mold surface formed by the belt 21, the profiled mold surface of the belt in this case facing inwardly towards the axis. The cylindrical guide members 11, 12 are disposed coaxially one within the other as before, but they extend from an annular drive member 37 which is journalled on the extrusion head 22 by bearings 38 for rotation about the axis of the assembly. The annular member 37 has peripheral gear teeth 39 meshing with a driving pinion 40 by which it is driven. The inner guide member 11 is supported by a spider 41 to permit passage of the belt 21 as it passes from the outer to the inner helical portions of its path. The pressurized air for molding the thermoplastic material 23 against the mold surface of the belt is introduced by a hollow pipe 42 extending axially through the extrusion head 22. This pipe carries a pair of axially spaced baffle members 43, 44 defining a chamber 45 to permit the requisite build up of air pressure.

This apparatus also includes auxiliary means for restraining the belt 21 against rotation in response to rotation of the shaft. In this case the rollers 29, shown as two diametrically opposed rollers although in general the number of rollers is not critical, are arranged around the outside of the belt 21. As in the preceding embodiment the rollers 29 have stub shafts 31 which are journalled to the rotor assembly, and pinions 35 which mesh with a stationary ring gear 36 thus forming an epicyclic drive train.

Figure 8:
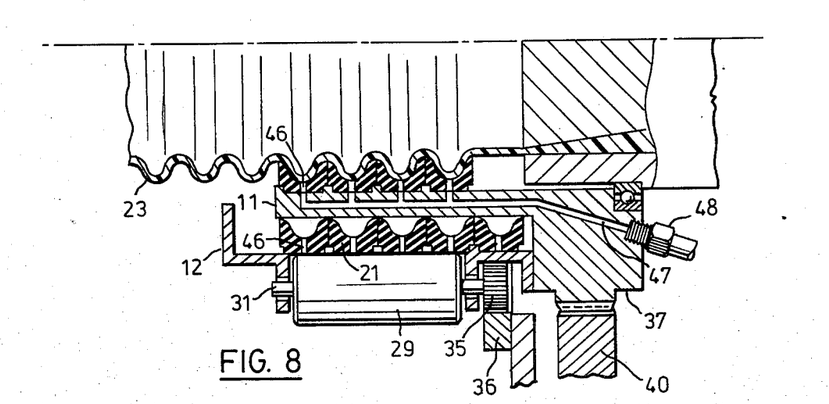
FIG. 8 shows a detail of a feed mechanism used as a mold assembly in the production of corrugated thermoplastic tubing by vacuum forming.

In the embodiment illustrated in FIG. 8, the plastic tube 23 is expanded by vacuum rather than internal gas pressure. For this purpose the belt 21, which provides the mold profile, is formed with perforations 46. The cylindrical guide member 11 and the annular member 37 from which it extends are formed with an internal passage 47 having terminal openings which register with the perforations 46. The passage 47 is connected to a vacuum line through a connector 48. In other respects the embodiment shown in FIG. 8 corresponds to the embodiment shown in FIG. 7.

Figure 9:
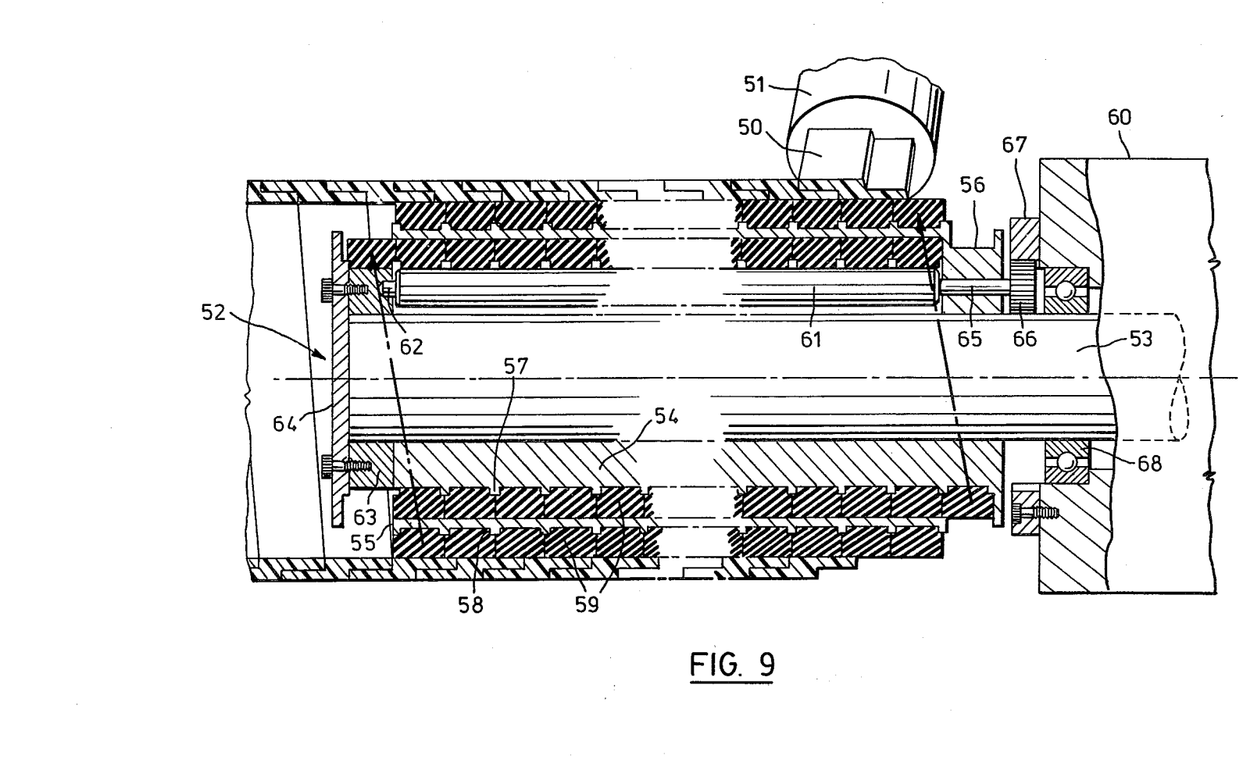
FIG. 9 is a sectional elevation of a feed mechanism for use as a rotary mandrel.

The principles of the invention are readily applicable to other purposes in which a continuously advancing cylindrical support surface is required, the support surface being provided by an endless flexible member which is configured as a double helix and which is continuously recycled in response to the rotation of a shaft. One such application is to the manufacture of tubing by the method in which a ribbon of plastic material is continuously extruded onto the upper surface of a rotating mandrel so as to extend along a helical path as the mandrel rotates, adjacent overlapping convolutions of the ribbon being joined to form the tube. An example of this application is illustrated in FIG. 9. A ribbon of plastic material 50 is continuously extruded from an extrusion die 51 onto the upper surface of a horizontally oriented mandrel 52. The mandrel 52 comprises a rotary drive shaft 53 to which is keyed a composite sleeve for rotation therewith. The sleeve provides a first cylindrical guide member 54 and a second cylindrical guide member 55 which are interconnected at one end by a spider 56. The components are assembled in coaxial relationship, the guide member 54 between disposed coaxially within the guide member 55, which is connected to the inner member 54 for rotation with it. The external surface of the inner guide member 54 is formed with an upstanding helical flange 57 which defines a helical groove or feed channel extending along said external surface. The external surface of the outer guide member 55 is similarly formed with an upstanding helical flange 58 which defines a second helical groove or feed channel extending along its outer surface; these helical grooves are of the same pitch, but it is important to note that they are of opposite hand, that is, one follows a left-handed helix and the other follows a right-handed helix.

An endless flexible belt 59 is carried by the inner and outer guide members, the belt 59 being constrained by the guide members to extend helically along the feed channels in the configuration of a double helix as described with reference to the preceding embodiments of the invention. Thus, the belt 59 has a first helically extending portion located by the inner feed channel and a second helically extending portion located by the outer feed channel. The contacting surfaces of the belt and the cylindrical guide members are treated or lined with an antifriction material, such as TFE, so that the belt can readily slide along the feed channels.

The shaft 53 extends from a stationary mounting 60, being journalled in bearings 68 for rotation about a horizontal axis. In this assembly in order to prevent the belt 59 from rotating with the shaft 53 while permitting the belt to provide a continuously advancing slowly rotating surface to carry the plastic ribbon 50 along a helical path, the belt is coupled to the shaft 53 by a differential drive mechanism. This differential drive mechanism is basically the same as the epicyclic drive shown in FIG. 5 and comprises essentially a plurality of rollers 61 which are circumferentially spaced around the shaft axis. Each roller 61 has a stub shaft 62 at one end which is journalled in an annular carrier 63 bolted to the end flange 64 of the shaft. The other end of each roller 61 has a shaft 65 which is journalled in the spider 56 and carries a pinion 66 which meshes with a ring gear 67 mounted on the end face of the mounting 60. Thus, the mechanism provides an epicyclic drive train by which the rollers 61 are caused to rotate in response to rotation of the shaft but in the opposite direction. These rollers are accommodated in recesses in the periphery of the inner guide member 54 but protrude therefrom so as to engage the inner portion of the belt frictionally. Thus the belt is partially restrained from rotating with the shaft 53, and is therefore caused to follow the double helical path defined by the sleeve. In this way, the surface of the mandrel onto which the ribbon 50 is extruded advances continuously while slowly rotating at a speed determined by the shaft speed and the velocity ratio of the epicyclic drive train.

Figures 10, 11:
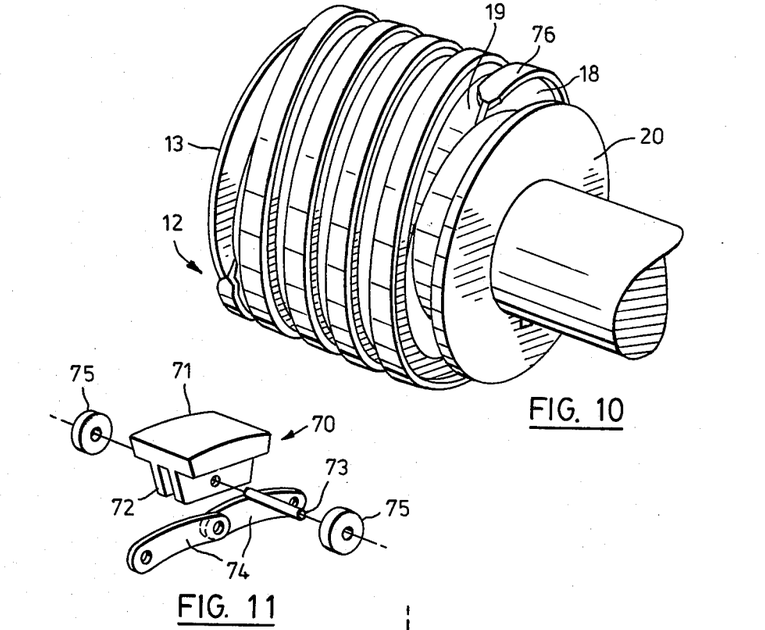
FIG. 10 is a view similar to FIG. 2 of the rotor of a feed mechanism wherein instead of an endless belt a chain of articulately interconnected bearing elements is employed.
FIG. 11 is an exploded view showing the components of one of the bearing elements.

Although in the embodiments of the invention so far described the flexible bearing member is constituted by endless belt, it is to be understood that the bearing member may alternatively take the form of an endless chain of articulately interconnected discrete bearing elements. For example, FIG. 11 illustrates one element of such a chain and FIG. 10 illustrates the rotor structure in which the chain is used. Referring to FIG. 11, each bearing element 70 has a rounded convex top surface 71 and depending legs 72 which are apertured to receive a pin 73. Mounted on the pin 73 are a pair of links 74 by which adjacent elements are interconnected to form the chain, and a pair of rollers 75 which run along the feed channels of the rotor. The rotor shown in FIG. 10 is essentially the same as the rotor shown in FIG. 2 and corresponding parts are denoted by the same reference numerals. The one difference however is that the helical flange 18 of the outer guide member 12 is formed with a cross flange 76.

Figure 12:
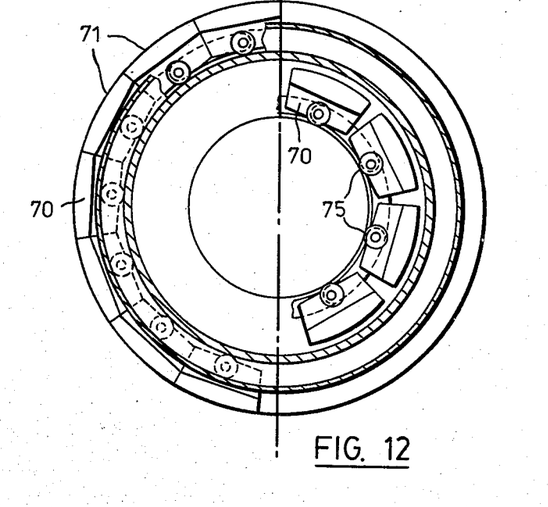
FIG. 12 is a cross-sectional view of a feed mechanism having the rotor of FIG. 10 and a chain of bearing elements of the type shown in FIG. 11.
Figure 13:
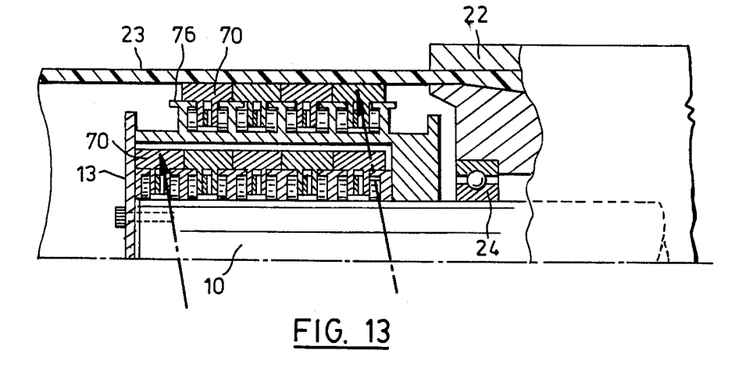
FIG. 13 is a half-sectional elevation of the feed mechanism, employing a chain of discrete bearing elements, used in the production of thermoplastic tubing.

FIG. 12 is a cross-sectional view of the feed mechanism in which such a chain is used in place of a continuous belt. It will be noted that the top surfaces 71 of the bearing elements along the outer feed channel, i.e. along the outer portion of the bearing member, abut one another to form a continuous bearing surface. FIG. 13 shows a detail of a mold assembly corresponding to the mold assembly of FIG. 4 except that the bearing member, instead of being an endless belt, is an endless chain as described with reference to FIGS. 10, 11 and 12. It will be noted that the top surfaces of adjacent bearing elements 70 abut edge to edge as well as end to end, thus providing a continuous cylindrical support surface.

Figure 14:
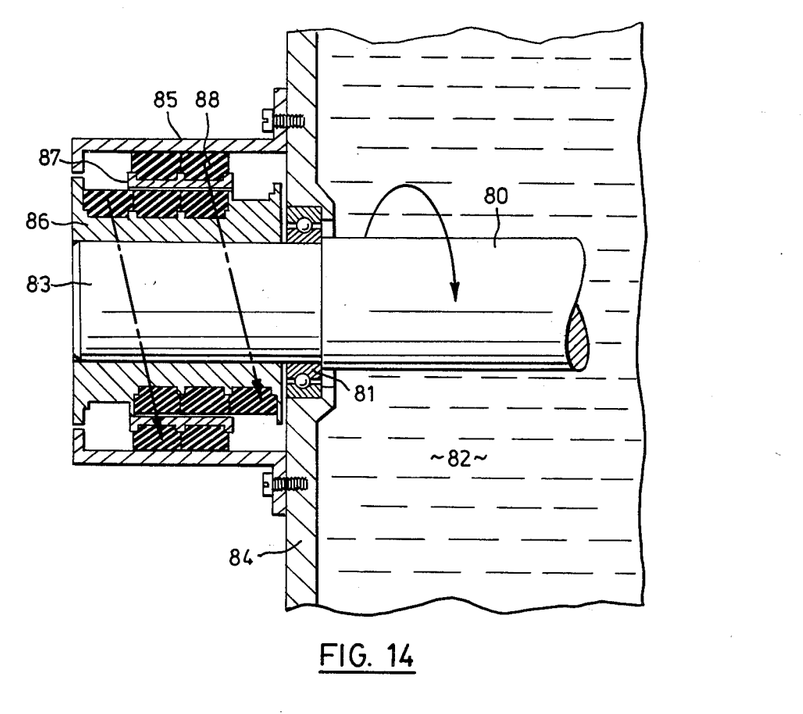
FIG. 14 shows another feed mechanism in accordance with the invention being used as a shaft seal.

A feed mechanism operating on exactly the same principles may be used as a shaft seal, as illustrated in FIG. 14. Referring to FIG. 14, the shaft 80 is journalled by bearings 81 in a housing filled with oil 82. The shaft has an extension 83 which extends through an opening in the wall 84 of the housing. The shaft extension 83 extends into an external seal housing formed by a cylindrical wall member 85 extending from the wall 84. Mounted on the shaft extension for rotation therewith are a pair of inner and outer cylindrical guide members 86, 87 which carry an endless flexible belt 88. As described with reference to the earlier figures the guide members 86, 87 are formed with respective helical grooves of the same pitch and opposite hand, the grooves defining respective feed channels wherein the belt is located and thereby retained in a double helical configuration of the type illustrated in FIG. 3. The belt slidingly engages the guide members over the areas of contact with them. Adjacent convolutions of the belt are disposed in edge-abutting relation so that the exposed surfaces of each of the inner and outer portions of the belt form a continuous bearing surface. The cylindrical wall member 85 engages the bearing surface formed by the outer portion of the belt to restrain the belt against rotation. Therefore, as the shaft 80 rotates, the belt is continuously advanced along the feed channel of one guide member and returned along the feed channel of the other guide member, without rotation. The continuous bearing surface formed by the outer helix of the belt forms a sliding seal with the inner face of the wall member 85.

What we claim is:

1. A feed mechanism comprising a rotor, and an endless flexible bearing member mounted on the rotor,
   the rotor comprising a pair of cylindrical guide members arranged coaxially one within the other, said members being mounted for rotation in unison about a common axis,
   each of said guide members providing a helical groove defining a feed channel, said feed channels facing in the same direction with respect to said axis,
   said helical grooves being of the same pitch and opposite hand,
   the endless flexible bearing member having respective first and second portions constrained by the guide members to extend helically along said feed channels, the bearing member slidingly engaging the guide members therealong,
   at least one of said bearing member portions protruding from the respective feed channel,
   and means providing a cylindrical wall positioned to engage said protruding portion of the bearing member for restraining the belt against rotation,
   whereby the bearing member is continuously advanced along one said feed channel and returned along the other said feed channel without rotation in response to rotation of the rotor.

2. A feed mechanism according to claim 1, wherein the flexible bearing member is an endless belt.

3. A feed mechanism according to claim 1, wherein the flexible bearing member is formed by a chain of articulately interconnected discrete bearing elements defining a continuous bearing surface.

4. A feed mechanism comprising:
   a rotary shaft,
   first and second cylindrical guide members mounted coaxially on said shaft for rotation therewith, the first and second guide members having respective external helical grooves thereon defining first and second feed channels,
   said helical grooves being of the same pitch and opposite hand,
   an endless flexible bearing member carried by said guide members and constrained thereby, the bearing member having a first portion extending helically along said first feed channel and a second portion extending helically along said second feed channel, the bearing member slidingly engaging the guide members along said channels,
   the second portion of the bearing member protruding from said second channel for frictional engagement with a restraining surface,
   whereby the bearing member is continuously advanced along said second feed channel and returned along said first feed channel without rotation in response to rotation of the shaft.

5. A feed mechanism according to claim 4, wherein the bearing member is formed by a chain of articulately interconnected discrete bearing elements defining a continuous bearing surface.

6. A feed mechanism according to claim 4, wherein the bearing member is an endless belt.

7. A feed mechanism according to claim 6, further comprising auxiliary means for restraining rotation of the belt in response to rotation of the shaft, said auxiliary means comprising a plurality of rollers frictionally engaging said first portion of the belt, the rollers extending parallel to the shaft, and drive means coupled to the rollers for rotating the rollers in response to rotation of the shaft in the direction opposite thereto.

8. A feed mechanism according to claim 7, wherein the rollers are journalled in recesses extending along the periphery of the shaft, each roller protruding from its recess sufficiently to engage said first portion of the belt.

9. In combination with an extrusion head for extruding a tube of plastic material, the extrusion head having an annular die opening defining a predetermined axis, means for supporting the tube of plastic material as it is extruded from the die comprising:
   a rotary shaft extending from said extrusion head and journalled therein for rotation about said axis,
   first and second cylindrical guide members mounted coaxially on said shaft for rotation therewith, the first and second guide members having respective external helical grooves thereon defining first and second feed channels,
   said helical grooves being of the same pitch and opposite hand,
   an endless flexible bearing member carried by said guide members and constrained thereby, the bearing member having a first portion extending helically along said first feed channel and a second portion extending helically along said second feed channel, the bearing member slidingly engaging the guide members along said channels,
   the bearing member protruding from said second feed channel for frictional engagement with the tube of plastic material as it is extruded,
   whereby the bearing member is continuously advanced along said second feed channel and returned along said first feed channel without rotation in response to rotation of the shaft, thereby providing a continuously advancing support surface for the plastic tube.

10. The combination claimed in claim 9, further comprising a cylindrical wall member extending axially from the extrusion head, the wall member surrounding the plastic tube and defining therewith an annular chamber, and means for supplying pressurized gas into said chamber for urging the plastic tube into engagement with said support surface.

11. The combination claimed in claim 10, wherein the bearing member is formed by an endless chain of articulately interconnected discrete bearing elements defining said support surface.

12. The combination claimed in claim 10, wherein the bearing member is an endless belt.

13. The combination claimed in claim 12, wherein the belt has a contoured external surface defining within said chamber a mold for molding the plastic tube.

14. The combination claimed in claim 13, wherein the external surface of the belt has a continuous longitudinally extending trough, and wherein successive adjacent convolutions of the belt are disposed in edge-abutting relationship to define within said chamber a continuous mold surface defining a helically corrugated pattern.

15. A feed mechanism according to claim 12, further comprising auxiliary means for restraining rotation of the belt in response to rotation of the shaft, said auxiliary means comprising a plurality of rollers frictionally engaging said first portion of the belt, the rollers extending parallel to the shaft, and drive means coupled to the rollers for rotating the rollers in response to rotation of the shaft in the direction opposite thereto.

16. A feed mechanism according to claim 15, wherein the rollers are journalled in recesses extending along the periphery of the shaft, each roller protruding from its recess sufficiently to engage said first portion of the belt.

17. In combination with an extrusion head for extruding a tube of plastic material, the extrusion head having an annular die opening defining a predetermined axis, a mold assembly comprising:
an annular drive member journalled on the extrusion head for rotation about said axis,
first and second cylindrical guide members extending coaxially from said drive member one within the other for rotation in unison about said axis,
each said guide member having an internal surface providing a helical groove thereon, said helical grooves defining respective feed channels, said helical grooves being of the same pitch and opposite hand,
an endless flexible bearing member carried by said guide members, the bearing member having first and second portions constrained by the guide members to extend helically along said feed channels, the bearing member slidingly engaging the guide members therealong,
the bearing member protruding from the feed channel of the inner guide member for frictional engagement with the tube of plastic material as it is formed,
means for rotating the drive member whereby to rotate said guide members about said axis,
said protruding portion of the bearing member thereby defining a non-rotating continuously advancing mold surface for the plastic material, and
means for expanding the tube of plastic material in engagement with said mold surface.

18. The combination claimed in claim 17, wherein said means for expanding the tube of plastic material comprises:
means defining within the tube of plastic material a chamber adjacent the extrusion head,
and means for introducing pressurized gas into said chamber for urging the plastic material into engagement with the mold surface.

19. The combination claimed in claim 17 wherein the bearing member is an endless belt.

20. The combination claimed in claim 19, wherein the belt is formed with a continuous longitudinally extending trough defining along said mold surface a helically corrugated pattern, successive adjacent convolutions of the belt being in edge-abutting relationship.

21. A feed mechanism according to claim 20, further comprising auxiliary means for restraining rotation of the belt in response to rotation of the shaft, said auxiliary means comprising a plurality of rollers frictionally engaging said first portion of the belt, the rollers extending parallel to the shaft, and drive means coupled to the rollers for rotating the rollers in response to rotation of the shaft in the direction opposite thereto.

22. A feed mechanism according to claim 21, wherein the rollers are journalled in recesses extending along the periphery of the shaft, each roller protruding from its recess sufficiently to engage said first portion of the belt.

23. A shaft seal for a shaft journalled for rotation in a housing, the shaft having an extension protruding from a wall of the housing, comprising:
first and second cylindrical guide members mounted on said shaft extension for rotation therewith, said members being disposed coaxially one within the other,
each of said members having an external helical groove thereon defining a feed channel,
said helical grooves being of the same pitch and opposite hand,
an endless flexible belt carried by said guide members, the belt having respective first and second portions constrained by the guide members to extend helically along said feed channels, the belt slidingly engaging the guide members therealong,
a cylindrical wall member mounted on said wall of the housing and extending therefrom coaxially with the guide members,
the belt protruding from the guide channel of the outer guide member for frictional engagement with said wall member, whereby the belt is continuously advanced along one said feed channel and returned along the other without rotation in response to rotation of the shaft, successive adjacent convolutions of the belt being disposed in edge-abutting relationship thereby forming a sliding seal between the protruding portion of the belt and the inner surface of said wall member.

24. A rotary mandrel comprising:
a rotary shaft,
first and second cylindrical guide members mounted coaxially on said shaft for rotation therewith, the guide members having respective external helical grooves thereon defining first and second feed channels,
said helical grooves being of the same pitch and opposite hand,
an endless flexible bearing member carried by said guide members and constrained thereby, the belt having a first portion extending helically along said first feed channel and a second portion extending helically along said second feed channel, the bearing member slidingly engaging the guide members along said channels, the second portion of the bearing member protruding from said second channel and successive adjacent convolutions thereof being disposed in edge-abutting relationship to define a continuous mandrel support surface, and differential drive means for effecting rotation of said support surface in response to rotation of the shaft at a speed different therefrom, said differential drive means comprising a plurality of rollers frictionally engaging said first portion of the bearing member, the rollers extending parallel to the shaft, and epicyclic drive means coupled to the rollers and said shaft for rotating the rollers in response to rotation of the shaft in the direction opposite thereto.

25. A rotary mandrel according to claim 24, wherein the rollers are journalled in recesses extending along the periphery of the shaft, the rollers protruding from the recesses sufficiently to engage said first portion of the bearing member.

26. A rotary mandrel according to claim 25, wherein the flexible bearing member is an endless belt.

* * * * *